United States Patent
Jung et al.

(10) Patent No.: US 11,540,325 B2
(45) Date of Patent: *Dec. 27, 2022

(54) METHOD AND APPARATUS FOR RANDOM ACCESS ON A WIRELESS COMMUNICATION NETWORK

(71) Applicant: Motorola Mobility LLC, Chicago, IL (US)

(72) Inventors: Hyejung Jung, Palatine, IL (US); Vijay Nangia, Woodridge, IL (US); Ravikiran Nory, Buffalo Grove, IL (US); Joachim Löhr, Wiesbaden (DE); Prateek Basu Mallick, Langen (DE); Ravi Kuchibhotla, Gurnee, IL (US); Robert Love, Barrington, IL (US)

(73) Assignee: Motorola Mobility LLC, Chicago, IL (US)

( * ) Notice: Subject to any disclaimer, the term of this patent is extended or adjusted under 35 U.S.C. 154(b) by 19 days.

This patent is subject to a terminal disclaimer.

(21) Appl. No.: 16/915,997

(22) Filed: Jun. 29, 2020

(65) Prior Publication Data
US 2020/0337091 A1 Oct. 22, 2020

Related U.S. Application Data

(63) Continuation of application No. 15/935,947, filed on Mar. 26, 2018, now Pat. No. 10,736,147.

(60) Provisional application No. 62/601,509, filed on Mar. 24, 2017.

(51) Int. Cl.
*H04W 4/00* (2018.01)
*H04W 74/08* (2009.01)
*H04W 56/00* (2009.01)

(52) U.S. Cl.
CPC ... *H04W 74/0833* (2013.01); *H04W 56/0005* (2013.01)

(58) Field of Classification Search
CPC ......... H04W 74/0833; H04W 56/0005; H04W 28/04; H04W 72/04; H04W 72/042; H04W 88/08; H04L 5/0007
See application file for complete search history.

(56) References Cited

U.S. PATENT DOCUMENTS

| | | | | |
|---|---|---|---|---|
| 10,736,147 B2* | 8/2020 | Jung | ................. | H04W 74/0833 |
| 10,813,097 B2* | 10/2020 | Islam | ....................... | H04L 1/00 |
| 10,820,225 B2* | 10/2020 | Jung | .................... | H04W 48/10 |
| 10,873,975 B2* | 12/2020 | Freda | ................ | H04W 74/0833 |
| 10,993,174 B2* | 4/2021 | Ohara | .................... | H04W 72/04 |

(Continued)

*Primary Examiner* — Phuongchau Ba Nguyen
(74) *Attorney, Agent, or Firm* — Loppnow & Chapa; Matthew C. Loppnow

(57) ABSTRACT

A set of reference signals can be received. Each of the set of reference signals can be periodically transmitted by a network entity. Information of a plurality of random access channel preambles and a plurality of reference signals from the set of reference signals can be received via a dedicated radio resource control message. At least one reference signal of the plurality of reference signals can be detected. A reference signal can be selected from the detected at least one reference signal. A random access channel preamble of the plurality of random access channel preambles can be transmitted in a contention-free random access procedure. The random access channel preamble for transmission can be determined based on the selected reference signal.

20 Claims, 11 Drawing Sheets

(56) References Cited

U.S. PATENT DOCUMENTS

| | | | |
|---|---|---|---|
| 11,147,000 B2* | 10/2021 | Yiu | H04W 36/0058 |
| 11,159,224 B2* | 10/2021 | Gao | H04W 24/10 |
| 2015/0372851 A1* | 12/2015 | Kakishima | H04L 27/2657 |
| | | | 370/329 |
| 2017/0251460 A1* | 8/2017 | Agiwal | H04W 72/0406 |
| 2018/0115943 A1* | 4/2018 | Park | H04W 4/029 |
| 2018/0248642 A1* | 8/2018 | Si | H04J 11/0076 |
| 2018/0269939 A1* | 9/2018 | Hu | H04B 7/0626 |
| 2018/0270713 A1* | 9/2018 | Park | H04L 5/0053 |
| 2018/0279262 A1* | 9/2018 | Babaei | H04L 1/1874 |
| 2019/0387441 A1* | 12/2019 | Koskela | H04W 36/30 |
| 2020/0014453 A1* | 1/2020 | Takeda | H04W 74/0833 |
| 2020/0068616 A1* | 2/2020 | Qian | H04L 5/0053 |
| 2020/0112993 A1* | 4/2020 | Tsai | H04W 72/042 |
| 2021/0058947 A1* | 2/2021 | Lin | H04W 74/0833 |
| 2021/0127424 A1* | 4/2021 | Yasukawa | H04W 52/36 |
| 2021/0219345 A1* | 7/2021 | Agiwal | H04W 74/0833 |

* cited by examiner

METHOD AND APPARATUS FOR RANDOM ACCESS ON A WIRELESS COMMUNICATION NETWORK

BACKGROUND

1. Field

The present disclosure is directed to a method and apparatus for communicating on a wireless network. More particularly, the present disclosure is directed to random access on a wireless communication network.

2. Introduction

Presently, wireless communication devices, such as User Equipment (UE), communicate with other communication devices using wireless signals. When a Network Entity (NE) such as a Base Station (BS) or gNodeB (gNB) can create a number of narrow beams using a large number of antenna elements, the NE may incorporate multi-beam operation into Downlink (DL) and Uplink (UL) synchronization procedures to achieve a desired coverage especially in a frequency range above 6 GHz.

Under the multi-beam operation pattern, the NE may transmit more than one Synchronization Signal (SS) block per period. Each SS block carries at least Primary and Secondary Synchronization Signals (PSS/SSS) that may be Transmit (Tx) beamformed. Multiple SS blocks can be used to cover different intended spatial directions. In one example, an idle mode UE assumes that a SS burst set consisting of one or more SS blocks, up to 128 SS blocks, is transmitted with 20 millisecond (ms) periodicity, and the UE may detect one or a few SS blocks associated with NE Tx beams for the UE. Further, the SS block can include a Tertiary Synchronization Channel (TSCH) that can provide at least slot timing and frame timing information. Timing relationship among PSS, SSS, and TSCH within an SS block may be predefined, so the UE can decode TSCH after successful detection of PSS and SSS.

During a random-access procedure, the NE can obtain information on DL Tx beams and UL Receive (Rx) beams suitable for a UE. If the NE configures an association between a DL signal/channel, such as SS block/Physical Broadcast Channel (PBCH), and a subset of Random Access Channel (RACH) resources, such as time and frequency resources, and/or a subset of RACH preamble indices, and if UE selects at least one RACH resource and one RACH preamble according to its selection criteria associated to at least one SS block and preferred DL Tx beam corresponding with the SS block based on the DL measurement and corresponding association, then the NE can determine the Tx beam(s) used for transmitting a Random Access Response (RAR) message. When more than one SS block/Tx beam are associated with one RACH resource in order to reduce the RACH resource overhead and the NE detects multiple RACH preambles associated with different SS blocks/Tx beams in the RACH resource, it is not clear how the NE transmits the RAR message.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

At least some embodiments can provide a method and apparatus for random access on a wireless communicating network. At least some embodiments can also provide a method to locate SS blocks considering dynamic TDD operation and/or operation in unlicensed frequency bands with further reduction on signaling overhead compared to dynamically indicating the SS block locations. Some embodiments can also provide a mechanism to allow the NE to select/adjust a SS block transmission pattern depending on a cell loading condition, a cell operating pattern, such as a base station power-saving pattern, and/or deployment scenarios, such as Time Division Duplex (TDD) or Frequency Division Duplex (FDD) and/or a carrier bandwidth. Some embodiments can also provide method to transmit the RAR message in multi-beam-based RACH procedure.

According to a possible embodiment, a DL signal including a plurality of SS blocks can be received. At least one SS block can be detected from the plurality of SS blocks. A SS block can be selected from the detected at least one SS block. A subset of RACH resources and a subset of RACH preambles associated with the selected SS block can be identified. A RACH resource can be selected from the subset of RACH resources and a RACH preamble can be selected from the subset of RACH preambles. The selected RACH preamble can be transmitted on the selected RACH resource. A Random Access Radio Network Temporary Identifier (RA-RNTI) can be determined based on at least the selected RACH resource. At least a PDSCH including a RAR message can be received. The PDSCH can be based on the selected SS block and based on the determined RA-RNTI.

According to another possible embodiment, a DL signal including a plurality of SS blocks can be transmitted. A system information message indicating at least one RACH resource and at least one RACH preamble for at least one SS block of the plurality of SS blocks can be sent. A RACH preamble of the at least one RACH preamble can be received on a RACH resource of the at least one RACH resource. A PDSCH can be determined in response to receiving the RACH preamble. The PDSCH can be based on a SS block of the at least one SS block and can be based on a RA-RNTI. The RA-RNTI can be based on at least the RACH resource of the at least one RACH resource and the SS block is associated with the received RACH preamble on the RACH resource. A PDSCH including a RAR message can be transmitted.

Figure 1:
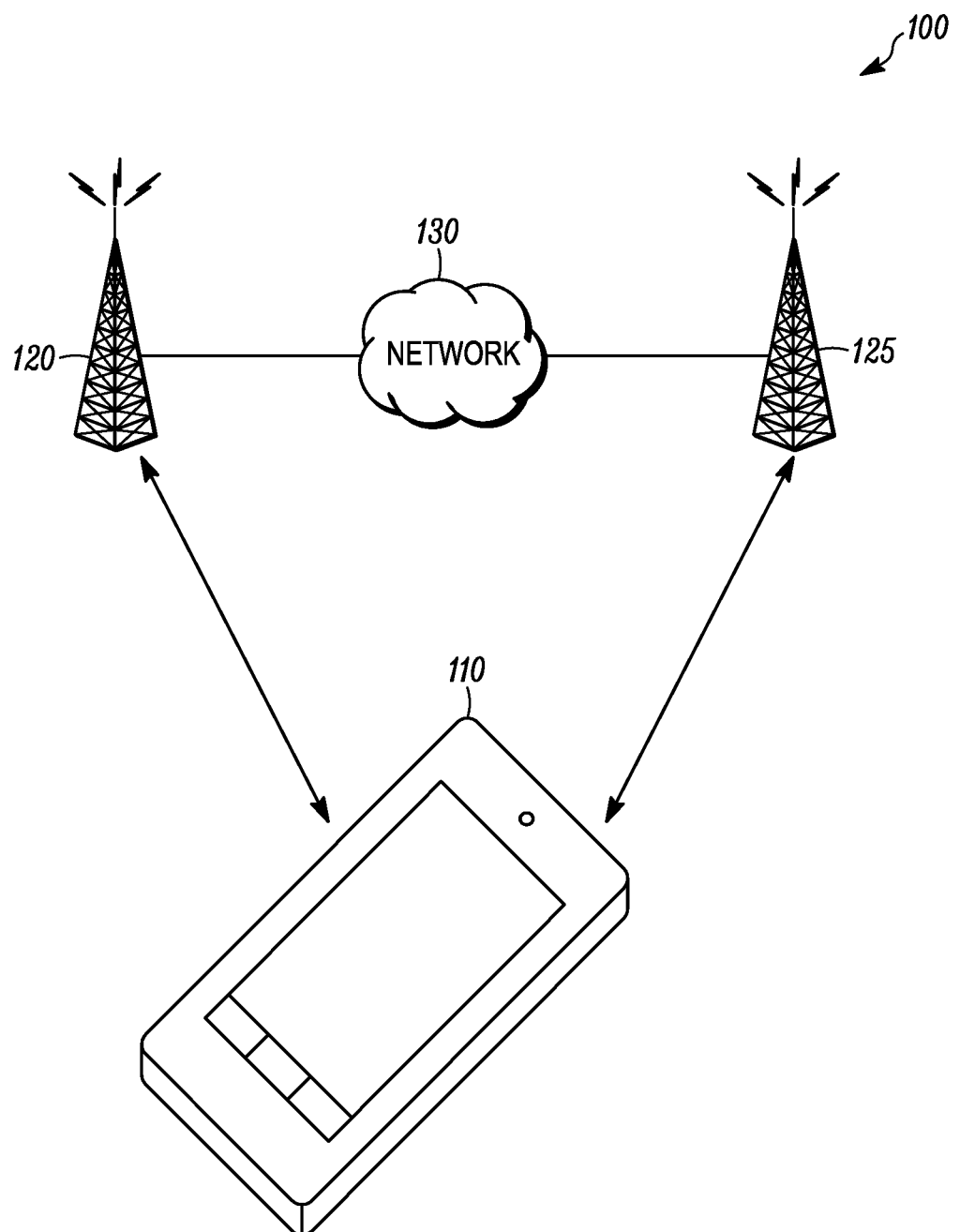
FIG. 1 is an example block diagram of a system according to a possible embodiment.

FIG. 1 is an example block diagram of a system 100 according to a possible embodiment. The system 100 can include a User Equipment (UE) 110, at least one NE 120 and 125, and a network 130. The UE 110 can be a wireless wide area network device, a user device, wireless terminal, a portable wireless communication device, a smartphone, a cellular telephone, a flip phone, a personal digital assistant, a personal computer, a selective call receiver, an Internet of Things (IoT) device, a tablet computer, a laptop computer, or any other user device that is capable of sending and receiving communication signals on a wireless network. The at least one NE 120 and 125 can be wireless wide area network base stations, NodeBs, enhanced NodeBs (eNBs), 5G, such as New Radio (NR), NodeBs (gNBs), unlicensed network base stations, access points, base station controllers, network controllers, Transmission/Reception Points (TRPs), different types of network entities from each other, or any other NE that can provide wireless access between a UE and a network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, a satellite communications network, a high altitude platform network, the Internet, and/or other communications networks.

A method can flexibly locate one or more SS blocks with limited signaling overhead for indicating the SS block location. This may be suitable for a highly loaded cell and/or a TDD cell serving low-latency traffic with dynamic UL/DL switching. On the other hand, the NE may not be allowed to complete transmitting multiple SS blocks within short time duration for network and UE energy saving.

In LTE, a Physical Downlink Control Channel (PDCCH) and a Physical Downlink Shared Channel (PDSCH) associated with delivery of a RAR message are addressed by an RA-RNTI. The RA-RNTI in LTE is determined by the time and frequency RACH resources, such as a function of the index of the subframe of a specified Physical Random Access Channel (PRACH) and the frequency-domain index of the specified PRACH within that subframe. Since only one RA-RNTI exists for one RACH resource, the NE may need to repeat PDCCH and PDSCH transmissions for the same RAR message with different Tx beams in multi-beam operation. This can make the delivery of RAR less efficient in terms of resource utilization.

The UE 110 can communicate with the network 130 via at least one base station 120. For example, the UE can send and receive control signals on a control channel and user data signals on a data channel.

According to a possible embodiment for a SS block transmission pattern 1, a UE, such as the UE 110, can assume that a NE, such as the NE 120, transmits one or more SS blocks within an SS block transmission window. The SS block transmission window size in terms of the number of slots may be set to be the same as the maximum allowed number of SS blocks per an SS burst set period in a given frequency range. For example, the maximum number of SS blocks per an SS burst set period and the SS block transmission window size can be 16 slots for a frequency range of 6 GHz or below, and 128 slots for a frequency range of above 6 GHz. If at most one SS block can be transmitted per slot within the SS block transmission window, and if the NE transmits the one or more SS blocks in consecutive slots starting from the first slot of the SS block transmission window, then UE can identify which slots in the SS block transmission window carry SS blocks by receiving an indication on the number of SS blocks per SS burst set from the NE. This indication can be transmitted in a System Information Block (SIB) or a Master Information Block (MIB), and the NE can change the number of SS blocks per SS burst set semi-statically. Transmitting SS blocks in the consecutive slots of the SS block transmission window can reduce signaling overhead to indicate SS block locations to both Radio Resource Control (RRC) connected mode and idle mode UEs, since transmitting SS blocks in the consecutive slots does not require a dynamic indication in every slot of the SS block transmission window. And yet, the NE can accommodate dynamic TDD operation, since at most one SS block is transmitted per slot and the rest of region in the slot can be dynamically used for DL/UL data and/or control transmission.

Figure 2:
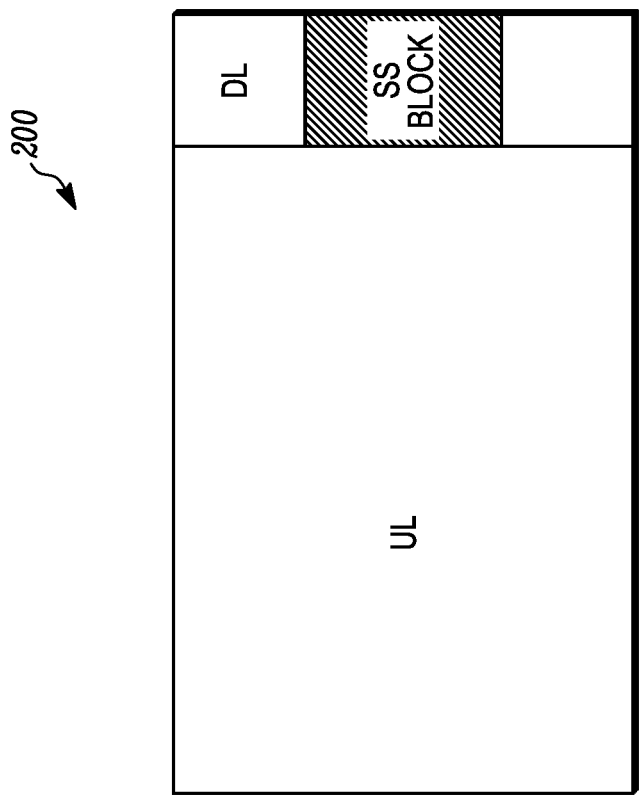
FIG. 2 is an example illustration of two allowed SS block locations in a slot for a SS block transmission pattern according to a possible embodiment.
Figure 2:
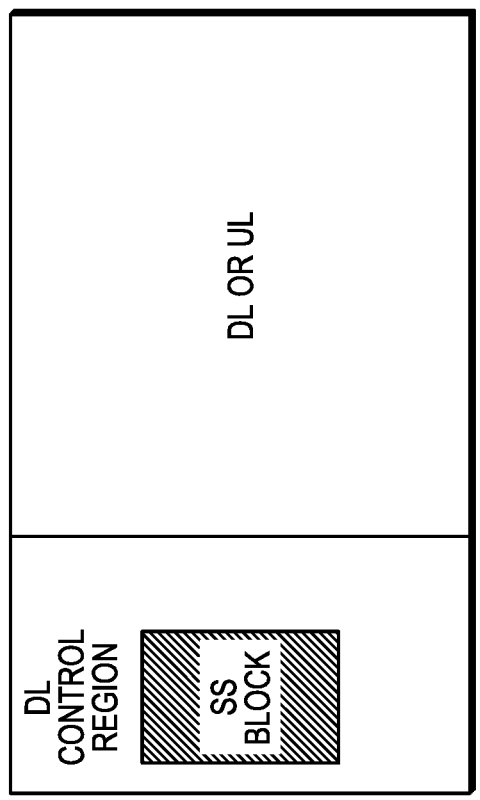

FIG. 2 is an example illustration 200 of two allowed SS block locations in the slot for the SS block transmission pattern, such as a SS block transmission pattern 1, described above according to a possible embodiment. Limiting possible SS block locations within the slot can further reduce signaling overhead required for indicating symbol-level timing information, such as a symbol index within a slot, by using slot timing. For example, the SS block can be transmitted in the beginning of the slot only. In another example, to accommodate long RACH preamble transmissions across a slot boundary, the NE can transmit the SS block on the last few symbols of the slot. One bit signaling in TSCH can indicate the location, such as the starting symbol location, of a SS block within a slot. The location of the SS block within a slot may be different for different slots and TSCH in the slot can indicate the SS block location within the slot. UEs performing UL transmissions can properly end uplink transmission before DL SS block transmission, based on a RACH configuration and/or an UL scheduling grant message. If a common Physical Downlink Control Channel (PDCCH) indicates the start of UL symbols, then idle mode and/or connected mode UEs may not need to blindly search for SS block location within a slot for mobility measurement.

Figure 3:
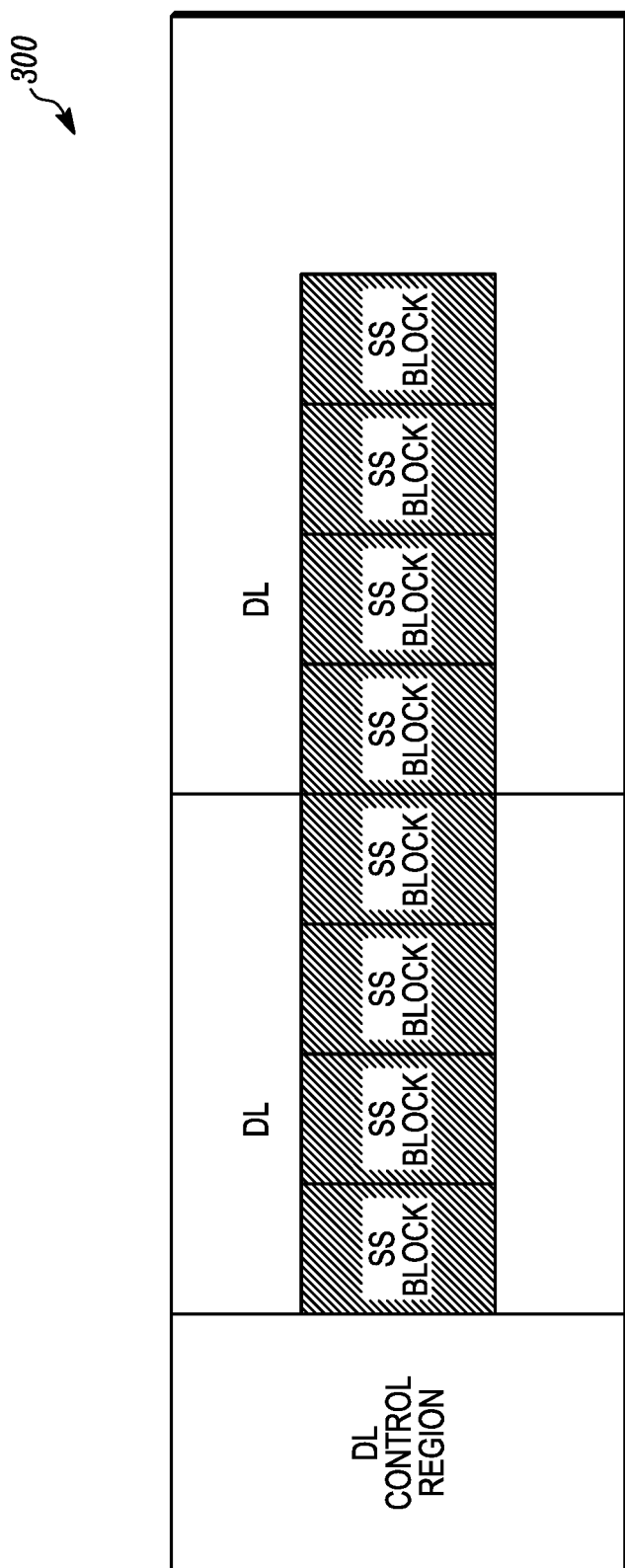
FIG. 3 is an example illustration of a SS burst transmission including eight SS blocks in two slot durations according to a possible embodiment.

FIG. 3 is an example illustration 300 of a SS burst transmission including 8 SS blocks in 2 slot durations according to a possible embodiment. According to this transmission pattern, such as SS block transmission pattern 2, the NE can complete SS block transmissions quickly by transmitting a set of consecutive SS blocks, such as SS burst, with no gap or some small possible gap between consecutive SS blocks. The NE can transmit one or more SS bursts during the SS burst set period. Table 1 can provide examples of SS block subcarrier spacing and corresponding SS block transmission time for the two different SS block transmission patterns.

TABLE 1

| Subcarrier spacing for SS block | 15 kHz | 30 kHz | 120 kHz | 240 kHz |
|---|---|---|---|---|
| Number of slots per radio frame (10 ms) | 10 | 20 | 80 | 160 |
| The max. number of SS blocks | 8 | 16 | 128 | 128 |
| SS block transmission time (pattern 1) | 8 slots, 8 ms | 16 slots, 8 ms | 128 slots, 16 ms | 128 slots, 8 ms |
| SS block transmission time (pattern 2) | 2 slots, 2 ms | 4 slots, 2 ms | 32 slots, 4 ms | 32 slots, 2 ms |

SS block transmission pattern 2 can save network and UE power consumption, since its transmission time can be much shorter compared to the SS block transmission pattern 1. In SS block transmission pattern 2, a slot within the SS burst set period where the NE can start transmitting SS burst can be predefined. In one example, the starting slot can be the first slot in the SS burst set period, and the SS block transmission window size can be set to be equal to the number of slots for one SS burst transmission multiplied by the number of SS bursts.

According to a possible embodiment, a highly loaded cell and/or a TDD cell serving low-latency traffic or UEs with low latency requirements can select the SS block transmission pattern 1. The SS block transmission pattern 2 can be used for a dormant cell that wakes up periodically, transmits SS blocks, and goes back to sleep if there is no access request. In addition, SS block transmission pattern 2 can be applicable to a FDD cell with a low system load and/or an FDD cell whose DL system bandwidth is much wider than the SS bandwidth. The UE can identify a SS block transmission pattern that the NE selected for the cell by detecting PSS/SSS in one or more SS blocks and decoding TSCH or MIB. The SS block transmission pattern can be explicitly indicated in the TSCH or PBCH carrying MIB.

Figure 4:
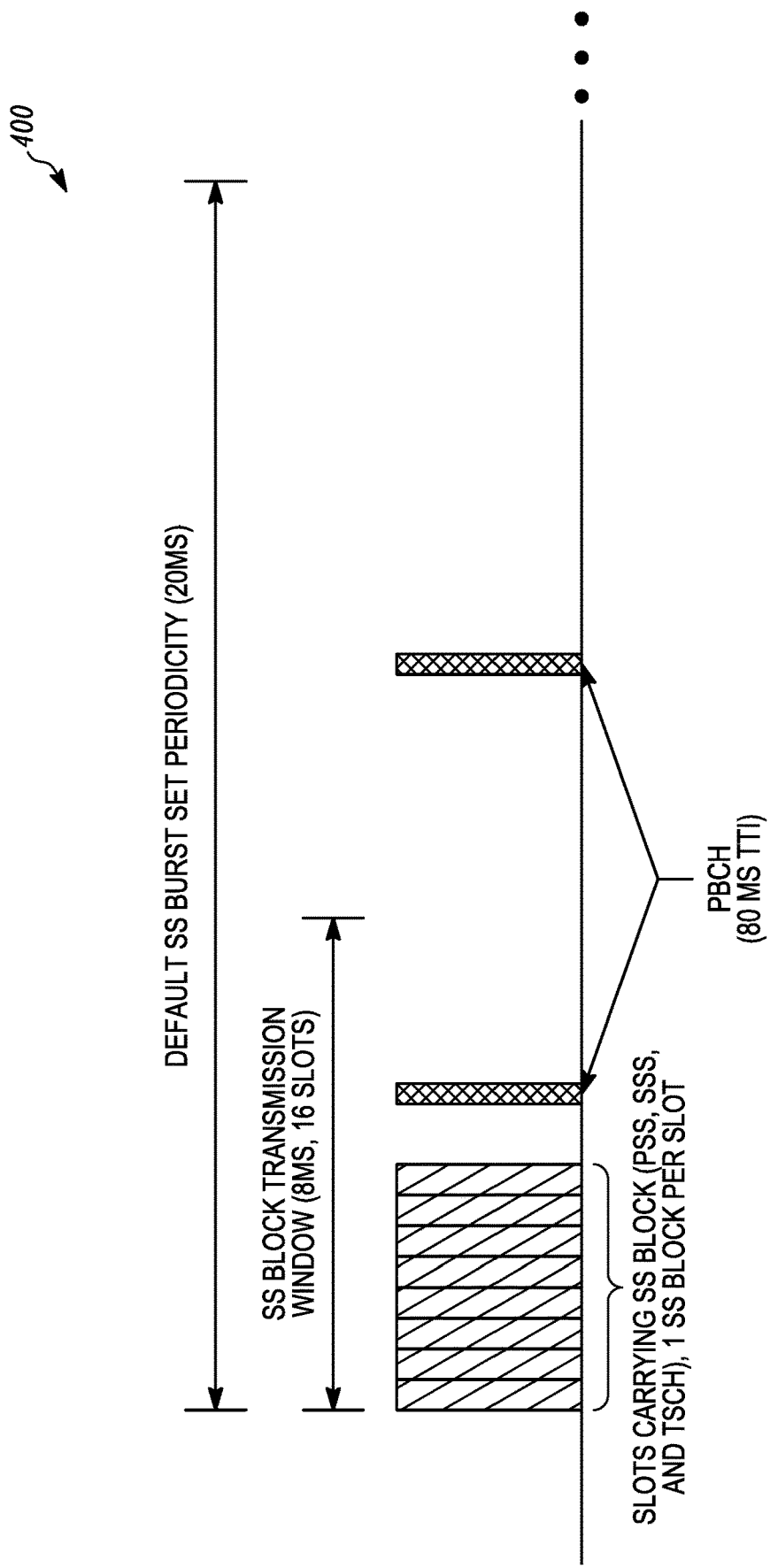
FIG. 4 is an example illustration of a SS block transmission pattern for one SS block per slot according to a possible embodiment.
Figure 5:
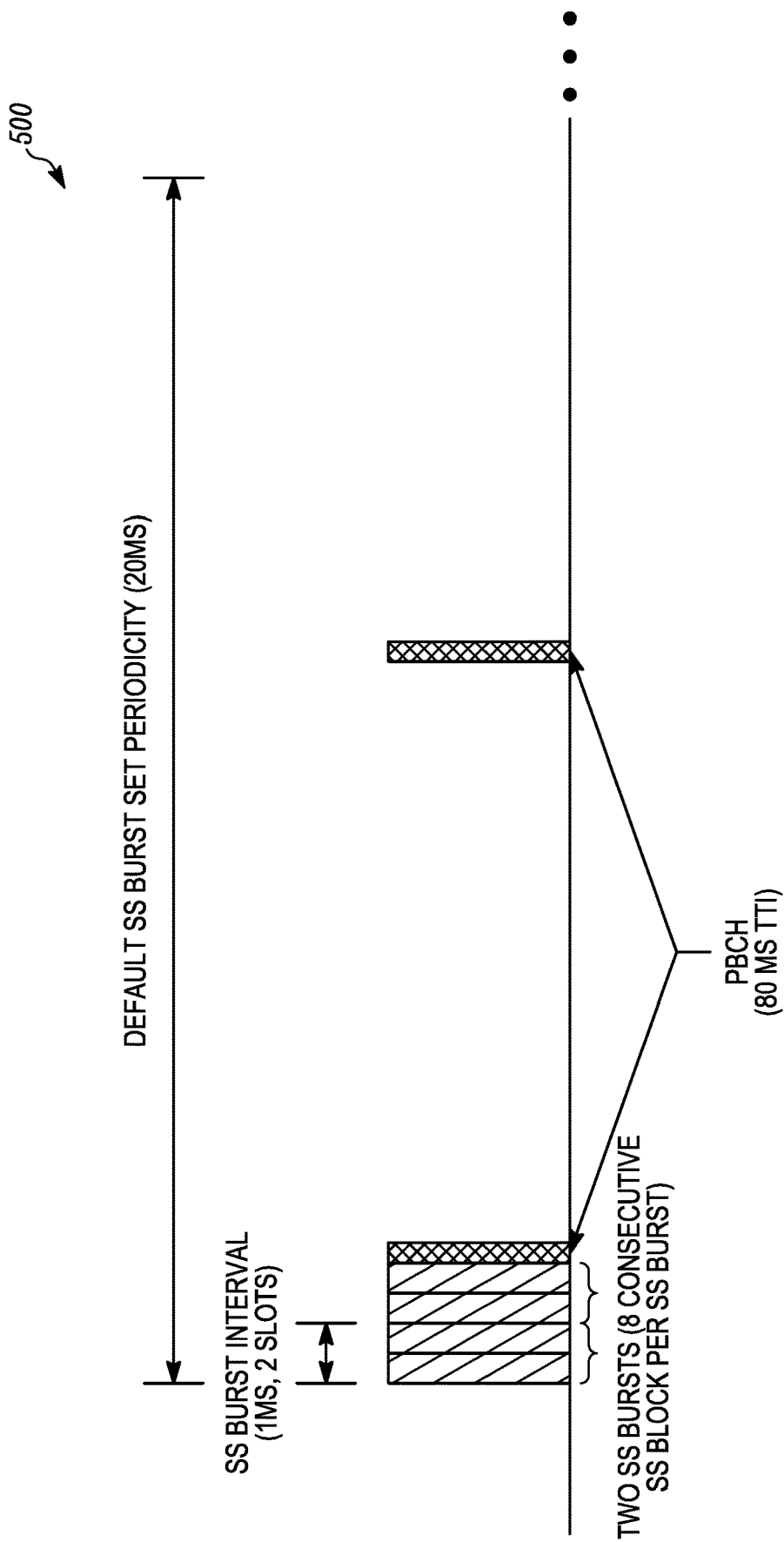
FIG. 5 is an example illustration of a SS block transmission pattern for eight consecutive SS blocks per two slots.

FIG. 4 is an example illustration 400 of a SS block transmission pattern 1 for one SS block per slot according to a possible embodiment. FIG. 5 is an example illustration 500 of a SS block transmission pattern 2 for 8 consecutive SS blocks per 2 slots. In these examples, an idle mode UE can assume that a default SS burst set periodicity is 20 ms and a maximum of 16 SS blocks can be transmitted within a SS burst set. In SS block transmission pattern 1, an SS block transmission window can be configured for the first 16 slots of the SS burst set period. A PBCH of 80 ms TTI can be transmitted in a slot every 10 ms, such as for different Redundancy Versions (RV) of channel coded MIB in different slots. A UE can first determine a radio frame index within a 80 ms PBCH TTI by decoding TSCH of a detected SS block. An example of a 10-bit TSCH payload, excluding CRC, can include a SS burst set, such as with a periodicity of 20 ms, index within the 80 ms PBCH TTI. The SS burst set index can have 2 bits. The 10-bit TSCH payload can also include a SS block transmission pattern indicator of 1 bit. If the SS block transmission pattern is pattern 1, a UE can interpret the 7 bits as an SS block index and equivalently a slot index within the SS burst set. If the SS block transmission pattern is pattern 2, a UE can interpret the 7 bits as a 3-bit SS block index within an SS burst and a 4-bit SS burst index within the SS burst set. With one or a few additional bits, the NE can indicate one of a few allowed starting symbols for an SS block within a slot. The above signaling can support at least up to 128 SS blocks per SS burst set.

In one embodiment, a NE and a UE can determine an RA-RNTI value based on the time and frequency RACH resource and based on an SS block index associated with a subset of RACH preambles or an index for the RACH preamble subset for multi-beam operation. The SS block transmission and associated subset of RACH preambles can be associated with a particular NE DL Tx beam or beam set. Alternatively, the RA-RNTI can be a function of the time and frequency RACH resources and based on a DL Tx beam Identity (ID) or a DL Tx beam set ID associated with the subset of RACH preambles. Further, when the NE detects RACH preambles associated with multiple DL Tx beams in a given RACH resource, it can prepare multiple RAR messages instead of a single RAR message. Each RAR message can include one or more Medium Access Control (MAC) RARs associated with one DL Tx beam. That is, the one or more MAC RARs associated with the same DL Tx beam can correspond to responses to the detected RACH preambles that are from the same subset of RACH preambles associated with the DL Tx beam.

The NE can transmit multiple PDCCHs and multiple PDSCHs for delivery of the multiple RAR messages. Each pair of PDCCH and PDSCH can be associated with one RAR message, can be addressed by a distinctive RA-RNTI that is determined by the time and frequency RACH resource and the SS block/beam index, and can be beamformed with the DL Tx beam associated with the RAR message. Alternatively, the NE can transmit one PDCCH and multiple PDSCHs for delivery of the multiple RAR messages. In this case, the PDCCH can be addressed by a first RA-RNTI that is determined by the time and frequency RACH resource, and can carry information on multiple DL resource assignments for the multiple PDSCHs. Furthermore, the NE can transmit the PDCCH with the multiple DL Tx beams associated with the detected RACH preambles by using at least one of beam diversity transmission schemes, such as beam cycling or space-frequency block coding. The multiple PDSCHs can be addressed by either the first RA-RNTI or multiple RA-RNTIs. Each RA-RNTI of the multiple RA-RNTIs can be determined by the time and frequency RACH resource and the index of SS block, beam, or RACH preamble subset. Alternatively, the multiple DL resource assignments and/or multiple PDSCHs can be addressed based on the index of SS block, beam, or RACH preamble subset. Each of the multiple PDSCHs can carry each RAR message and can be beamformed with the DL Tx beam associated with the RAR message.

According to another possible embodiment, when the NE detects RACH preambles associated with multiple DL Tx beams in a given RACH resource from one or more UEs, it can generate a single RAR message including one or more MAC RARs associated with the multiple DL Tx beams. This single RAR message can be delivered to intended UEs, such as UEs that transmitted successfully detected RACH preambles, via one PDCCH and one PDSCH. The NE can transmit the PDCCH and PDSCH with the multiple DL Tx beams associated with the detected RACH preambles by using at least one of beam diversity transmission schemes, such as using beam cycling or space-frequency block coding. The PDCCH and PDSCH can be addressed by an RA-RNTI that is determined by the time and frequency RACH resource. Alternatively, the single RAR message can be delivered via one PDCCH and multiple PDSCHs addressed by one RA-RNTI. The multiple PDSCHs can be addressed based on the index of SS block, beam, or RACH preamble subset. The NE can transmit the PDCCH by using one of beam diversity transmission schemes, and can transmit the multiple PDSCHs, each of which being beamformed with different DL Tx beams. Since the multiple PDSCHs can carry the same Transport Block (TB), the NE can use semi-persistent scheduling for the multiple PDSCHs, which can reduce Downlink Control Information (DCI) signaling overhead in the PDCCH. In another alternative method, the single RAR message can be delivered via multiple PDCCHs and multiple PDSCHs addressed by one RA-RNTI, where the multiple PDSCHs can carry the same TB. Each pair of PDCCH and PDSCH can be beamformed with different DL Tx beams associated with the detected RACH preambles.

According to another possible embodiment, the NE can decide whether to create a single RAR message or multiple RAR messages for a given RACH resource depending on the detected preambles and their associated Tx beams. If the number of detected preambles and/or the number of associated Tx beams is small, then the NE can create a single RAR message. Otherwise, the NE can create multiple RAR messages. A UE can receive either a single or multiple RAR messages with one RA-RNTI determined by the time and frequency RACH resource.

According to another possible embodiment, the NE can signal one or more random access backoff indicators, each of which can be associated with one or more subsets of RACH preambles and one or more corresponding DL Tx beams and SS blocks. The NE can include multiple MAC subheaders for random access backoff indicators in a single RAR message, each carrying a random access backoff indicator for a particular subset of RACH preambles. PDCCH(s) and PDSCH(s) for the delivery of the single RAR message can be transmitted with multiple DL Tx beams including a first set of DL Tx beams for the detected preambles and a second set of DL Tx beams for the random access backoff indicators. The first set of DL Tx beams can be partially or wholly overlapped with the second set of DL Tx beams. Alternatively, multiple MAC subheaders for random access backoff indicators can be split into multiple RAR messages. Further, the NE can include information of the associated DL Tx beams, such as SS blocks or CSI-RS resources, and corresponding subset of RACH preambles for each random access backoff indicator. For example, one RACH resource can be associated with up to 16 SS Blocks (SSBs). By using 2 reserved bits in a random access Backoff Indicator (BI) MAC subheader (according to 3GPP TS 38.321 V15.0.0), the NE can indicate the associated SSBs for each of up to 4 random access backoff indicators, as shown in Table 2.

TABLE 2

| Values of reserved bits in the BI MAC subheader | 00 | 01 | 10 | 11 |
|---|---|---|---|---|
| Corresponding SSB when 4 SSBs associated with a RACH resource | SSB0 | SSB1 | SSB2 | SSB3 |
| Corresponding SSBs when 8 SSBs associated with a RACH resource | SSB0, SSB1 | SSB2, SSB3 | SSB4, SSB5 | SSB6, SSB7 |
| Corresponding SSBs when 16 SSBs associated with a RACH resource | SSB0-SSB3 | SSB4-SSB7 | SSB8-SSB11 | SSB12-SSB15 |

For all the methods described above, a UE can determine a search space for PDCCH, such as a set of candidate PDCCHs, to receive single or multiple RAR messages. The search space determination can be based on the RA-RNTI. In a contention-free random access procedure, the UE may receive a MAC RAR in an RAR message that includes an indication on a DL control resource set, such as OFDM symbol(s) or sub-band(s), that UE has to monitor for subsequent communications.

Figure 6:
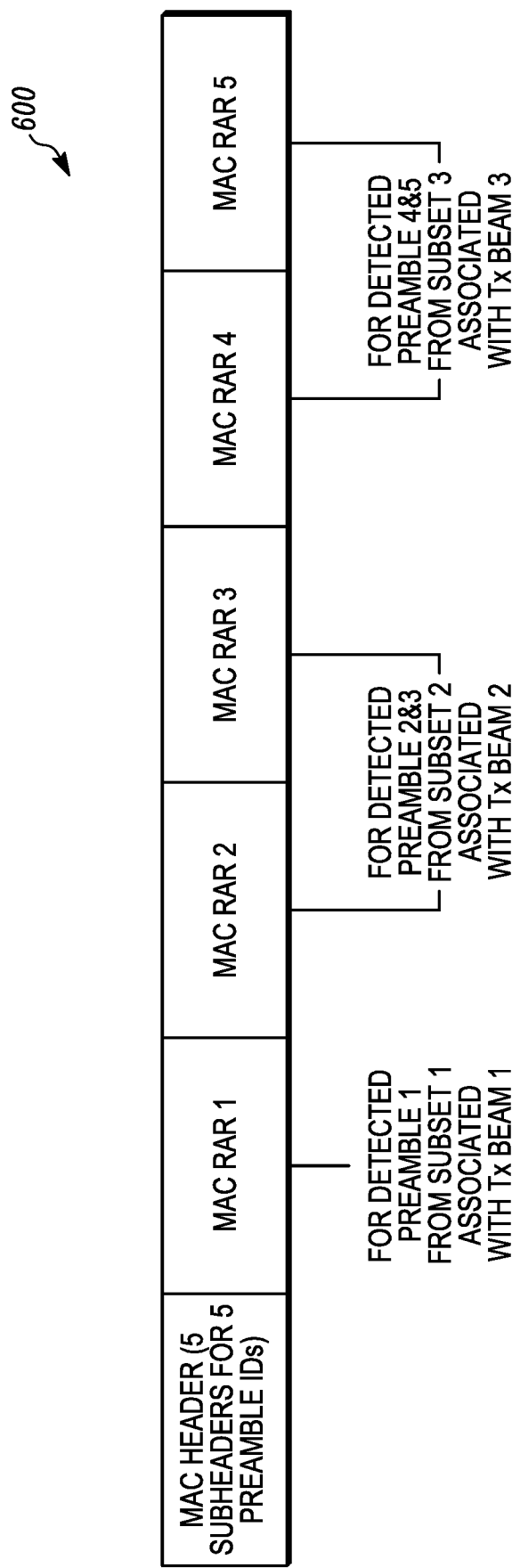
FIG. 6 is an example illustration of a RAR MAC PDU addressed by one RA-RNTI according to a possible embodiment.
Figure 7:
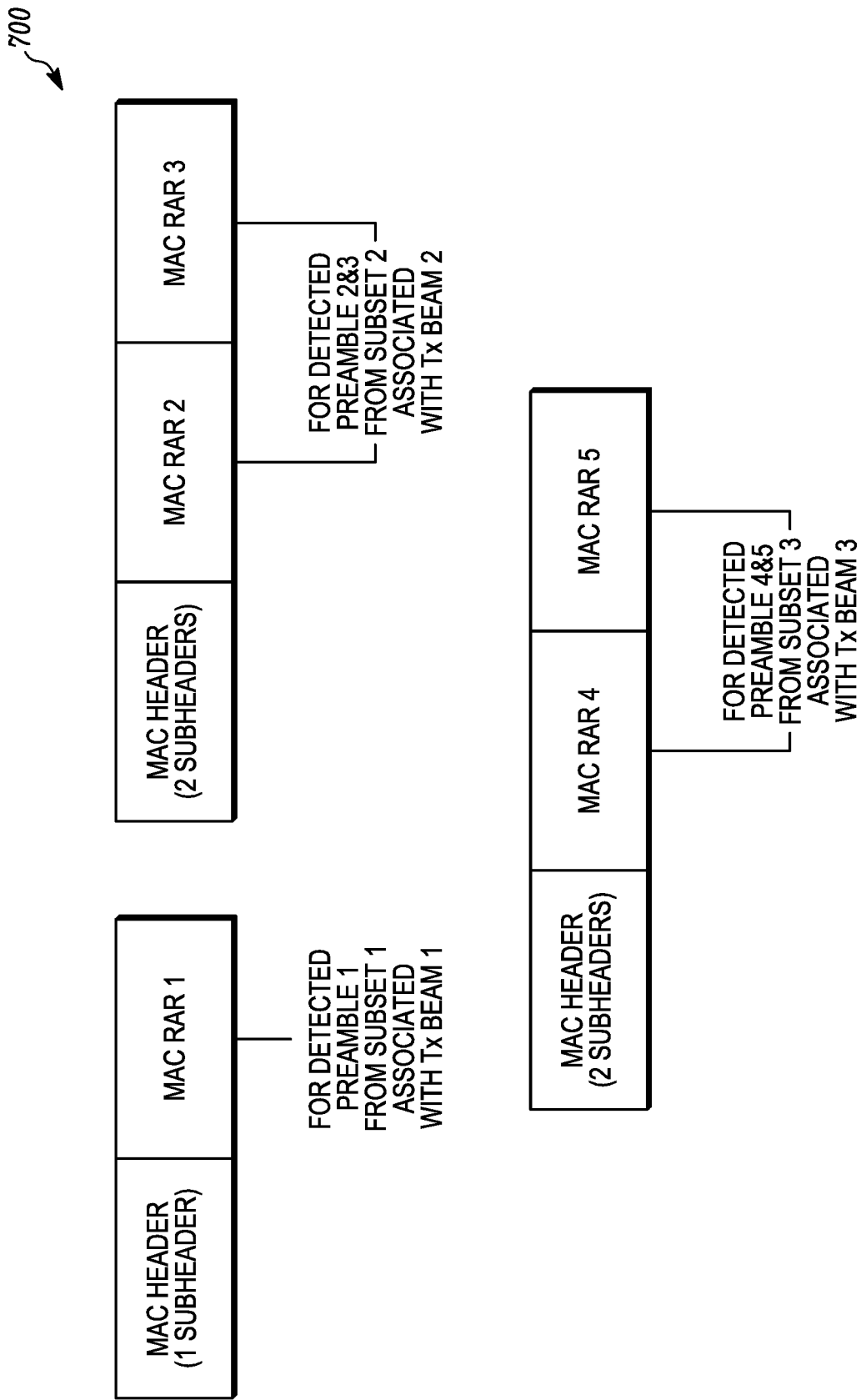
FIG. 7 is an example illustration of multiple RAR MAC PDUs addressed by one RA-RNTI according to a possible embodiment.

FIG. 6 is an example illustration 600 of a RAR MAC Protocol Data Unit (PDU) addressed by one RA-RNTI according to a possible embodiment. FIG. 7 is an example illustration 700 of multiple RAR MAC PDUs addressed by one RA-RNTI according to a possible embodiment. When the NE detects RACH preambles 1-5, where preamble 1 is from the RACH preamble subset 1 associated with DL Tx beam 1, preambles 2 and 3 are from the RACH preamble subset 2 associated with DL Tx beam 2, and preambles 4 and 5 are from the RACH preamble subset 3 associated with DL Tx beam 3, then one way to transmit RAR can be that the NE can create one RAR MAC PDU and a corresponding TB as shown in the illustration 600. Since this one TB can be delivered to UEs, each of which transmitted one of the RACH preambles 1-5 with selecting one of the three DL Tx beams, such as SS blocks or CSI-RS resources, 1-3, it may need to be transmitted 3 times with 3 PDSCHs. Since 3 PDSCHs have the same TB size, the NE can use a semi-persistent DL assignment for the 3 PDSCH transmissions. Each PDSCH carrying the TB can be beamformed with one of the three DL Tx beams, such as Tx beams 1-3, and all the PDSCHs carrying the TB can be addressed by one RA-RNTI, which can be determined by the time and frequency RACH resource. In another example shown in the illustration 700, the NE can create three small-size RAR messages, each according to an associated DL Tx beam of the DL Tx beams, such as SS blocks or CSI-RS resources, and can transmit 3 PDSCHs. Each PDSCH carrying a different TB can be beamformed with one of the three DL Tx beams, such as Tx beams 1-3, and can be addressed by an RA-RNTI determined by the time and frequency RACH resource. Alternatively, each PDSCH carrying a different TB can be addressed by an RA-RNTI determined by the time and frequency RACH resource and the index of SS block, beam, or RACH preamble subset.

In a contention-free random access procedure with multi-beam operation, a NE can include an indication on more than one RACH preamble indices in a PDCCH or in a dedicated RRC message that order UE to perform the contention-free random access. If more than one Tx beam is associated with a given RACH time-frequency resource and each Tx beam is associated with a subset of RACH preambles, the NE can include one RACH preamble index per subset of RACH preambles. For example, if there are 3 subsets of RACH preambles associated with 3 different Tx beams, such as SS blocks or CSI-RS resources, for a given RACH resource, the NE can indicate 3 RACH preambles assigned for the UE, where each RACH preamble can be selected from a distinctive subset of RACH preambles. The UE can indicate its preferred/selected Tx beam by selecting one RACH preamble from the assigned 3 preambles and by transmitting the selected RACH preamble to the NE. In a highly loaded system that serves a large number of UEs, assigning 3 preambles to one UE may reduce RACH capacity. In alternative embodiment, the NE can assign one preamble index for the UE, and the UE can apply a different cover code or a scrambling code to the assigned RACH preamble according to a selected Tx beam, in order to indicate the selected Tx beam.

Figure 8:
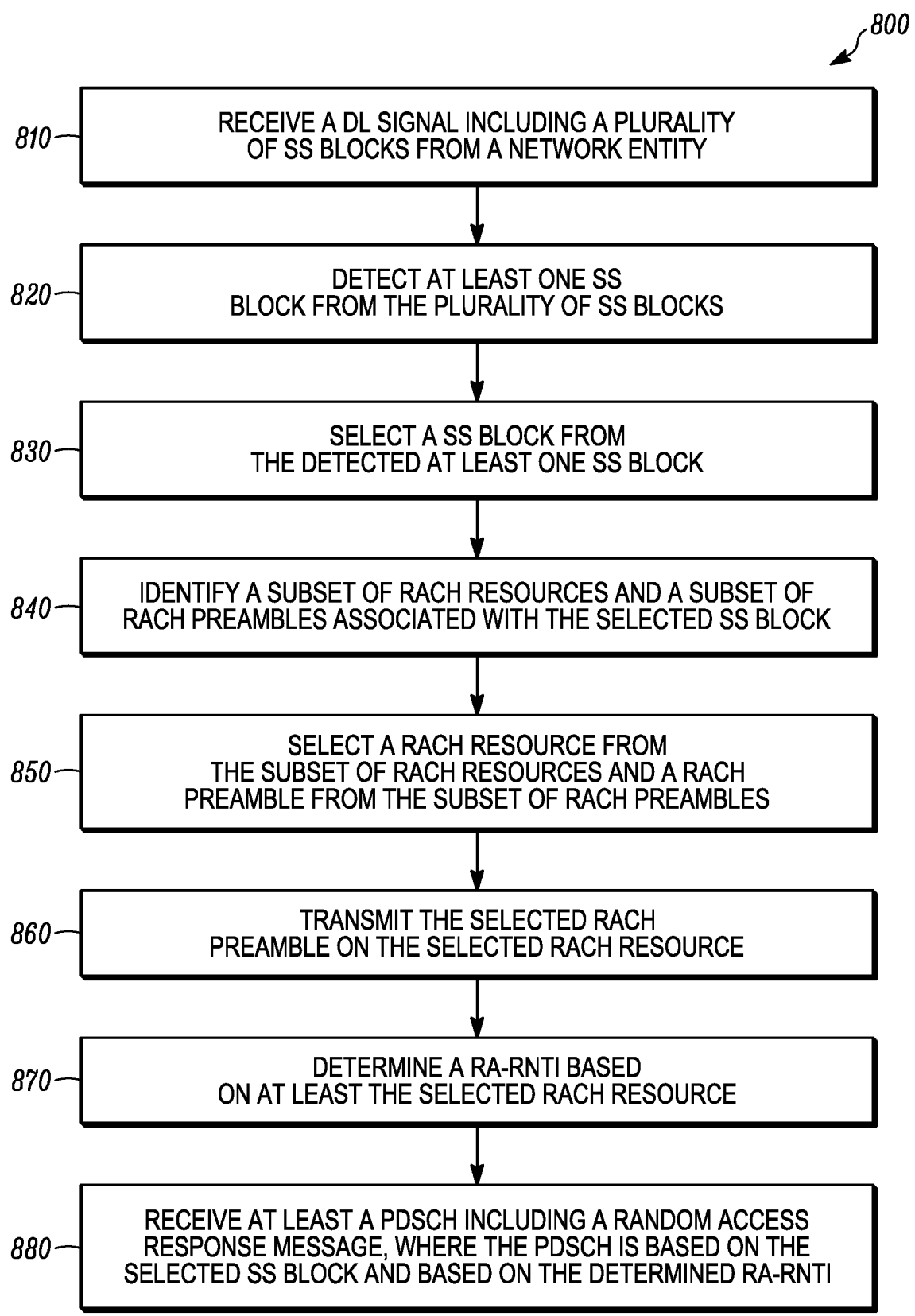
FIG. 8 is an example flowchart illustrating the operation of a wireless communication device according to a possible embodiment.

FIG. 8 is an example flowchart 800 illustrating the operation of a wireless communication device, such as the UE 110, according to a possible embodiment. At 810, a DL signal including a plurality of SS blocks can be received from a NE. At 820, at least one SS block can be detected from the plurality of SS blocks. At 830, an SS block can be selected from the detected at least one SS block. At 840, a subset of RACH resources and a subset of RACH preambles associated with the selected SS block can be identified. The RACH resources can be RACH time and frequency resources. There can be a mapping of the subset of RACH resources and the subset of RACH preambles to the selected SS block. At 850, a RACH resource can be selected from the subset of RACH resources and a RACH preamble can be selected from the subset of RACH preambles. At 860, the selected RACH preamble can be transmitted on the selected RACH resource.

At 870, a RA-RNTI can be determined based on at least the selected RACH resource. For example, the RA-RNTI associated with a PRACH in which the RACH preamble is transmitted, can be computed based on Technical Specification (TS) 38.321 as $$\text{RA-RNTI} = 1 + s\_id + 14 * t\_id + 14 * X * f\_id + 14 * X * Y * ul\_carrier\_id,$$

where $s\_id$ can be the index of the first OFDM symbol of the specified PRACH ($0 \leq s\_id < 14$), $t\_id$ can be the index of the first slot of the specified PRACH in a system frame ($0 \leq t\_id < X$), $f\_id$ can be the index of the specified PRACH in the frequency domain ($0 \leq f\_id < Y$), and $ul\_carrier\_id$ can be the UL carrier used for Msg1 transmission. The $ul\_carrier\_id$ can be 0 for a normal carrier and 1 for a Supplemental Uplink (SUL) carrier. The values X and Y can be specified in Technical Specification (TS) 38.213.

At 880, at least a PDSCH including a RAR message can be received. The PDSCH can be based on the selected SS block and based on the determined RA-RNTI. For example, a PDCCH carrying DL assignment information for the PDSCH can have a CRC scrambled by RA-RNTI. When the UE receives PDCCH with a CRC scrambled with the RA-RNTI, the UE can determine a search space based on the selected SS block and the RA-RNTI.

According to a possible implementation, a control channel search space associated with the selected SS block can be monitored. A PDCCH with a CRC can be received on the monitored control channel search space. The PDCCH CRC can be scrambled with the determined RA-RNTI. A MAC PDU can be received on a PDSCH associated with the received PDCCH. The MAC PDU can include either a MAC PDU including a set of RARs or a MAC PDU including a subset of the set of RARs. The PDCCH can indicate a PDSCH including a RAR message. The RAR message can be within a MAC PDU. For example, a gNB can choose a MAC PDU transmission pattern based on the number of detected preambles and the number of associated SS blocks or CSI-RS resources for a given RA-RNTI. The MAC PDU transmission pattern can include a pattern using one MAC PDU for transmitting multiple MAC RAR's or a pattern with different MAC PDUs for transmitting different MAC RARs, such as by splitting the MAC RARs between different MAC PDUs, where multiple RARs can be included in a MAC PDU.

The PDSCH can carry at least one RACH preamble index and at least one random access backoff indicator. The at least one RACH preamble index and the at least one random access backoff indicator can be associated with different SS blocks. For example, the PDSCH can carry a plurality of random access backoff indicators. Each of the plurality of random access backoff indicators can be associated with different at least one SS blocks. Each random access backoff indicator can be associated with one or more SS blocks.

Also, a first set of SS blocks associated with a first random access backoff indicator and a second set of SS blocks associated with a second random access backoff indicator can be disjoint, such that there is no SS block that is included in the first and second sets. A re-selected SS block can be selected. The re-selected SS block can be different than the selected SS block. A backoff time for the re-selected SS block can be shorter than a backoff time for the selected SS block. A Synchronization Signal-Reference Signal Received Power (SS-RSRP) of the re-selected SS block can be above a configured threshold value. Information of the associated at least one SS block for each of the plurality of random access backoff indicators can be received.

According to a possible embodiment, a RACH preamble index indication of a plurality of RACH preamble indices can be received. The indication can be received in a PDCCH message and/or a dedicated RRC message. The RACH preamble index indication of the plurality of RACH preamble indices can instruct the UE to perform contention-free random access. The indication of the plurality of RACH preamble indices can be one indication for all indices and/or can be multiple indications, where each indication can be for a given RACH preamble index. The indication of the plurality of RACH preamble indices can also include one RACH preamble index per subset of RACH preambles if more than one Tx beam, such as including SS blocks or CSI-RS resources, is associated with a given RACH time-frequency resource and each Tx beam is associated with a subset of RACH preambles.

A RACH preamble index can be selected from the plurality of RACH preamble indices. To select the RACH preamble index according to a possible implementation, an indication of a subset of SS blocks from the plurality of SS blocks can be received. Each of the plurality of RACH preamble indices can be associated with a distinctive SS block in the subset of SS blocks. Accordingly, the plurality of RACH preamble indices can be associated with a subset of SS blocks from the plurality of SS blocks. A SS block can be selected from the subset of SS blocks and the RACH preamble index can be selected based on the selected SS block. According to a possible implementation, a configuration for a plurality of CSI-RS resources can be received. An indication of a subset of CSI-RS resources from the configured plurality of CSI-RS resources can be received. A CSI-RS resource can be selected from the subset of CSI-RS resources. The RACH preamble index can be selected based on the selected CSI-RS resource. The RACH preamble index and a RACH resource can be associated with a CSI-RS resource. For example, there can be mapping between a CSI-RS resource and the RACH preamble and the RACH resource. Contention-free random access can be performed based on the selected RACH preamble index.

According to a possible embodiment, an indication of a preamble index can be received. An indication of a subset of SS blocks from the plurality of SS blocks can be received. A SS block can be selected from the subset of SS blocks. A scrambling code can be determine based on the selected SS block. The determined scrambling code can be applied to a RACH preamble of the indicated preamble index to obtain a scrambled RACH preamble. The scrambled RACH preamble can be transmitted to the NE.

Figure 9:
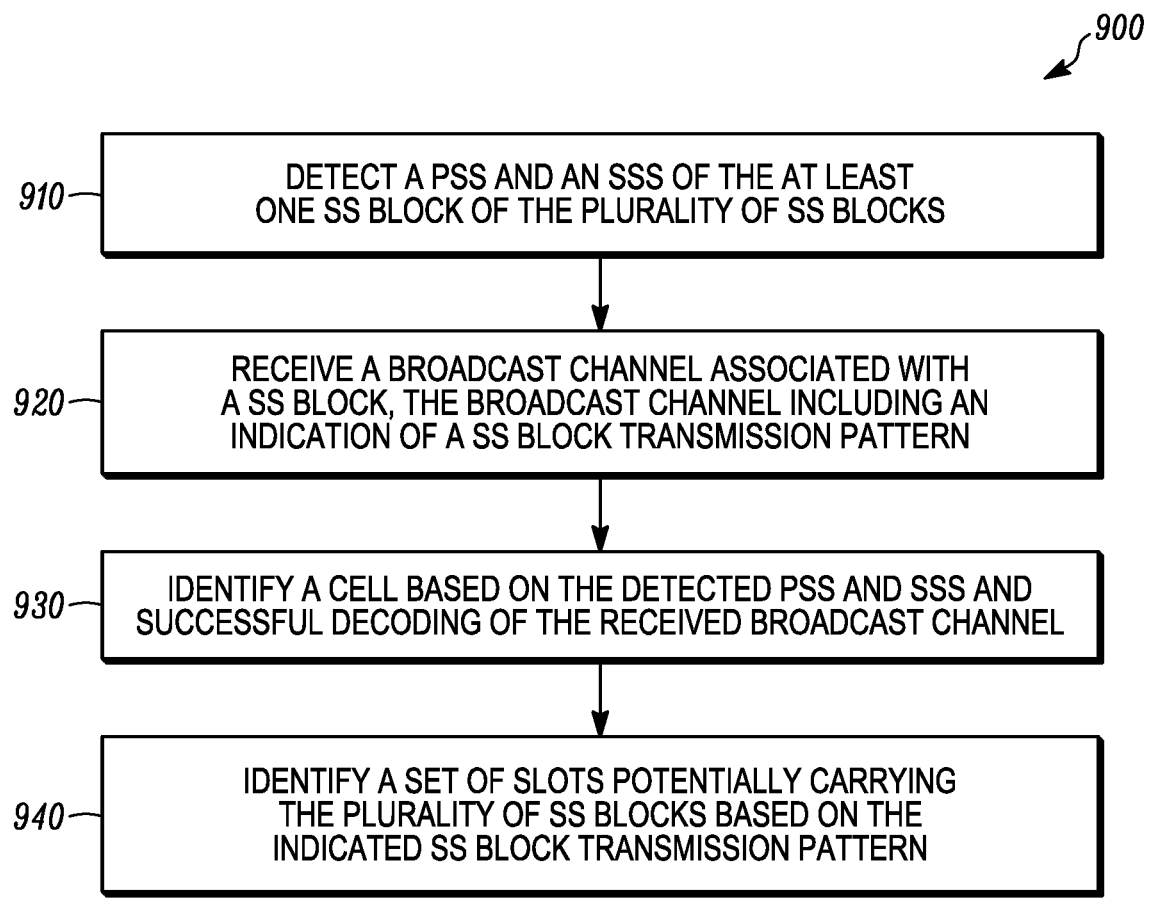
FIG. 9 is an example flowchart illustrating the operation of a wireless communication device according to a possible embodiment.

FIG. 9 is an example flowchart 900 illustrating the operation of a wireless communication device, such as the UE 110, according to a possible embodiment. At 910, a PSS and an SSS of the at least one SS block of the plurality of SS blocks described above can be detected.

At 920, a broadcast channel associated with a SS block can be received. The broadcast channel can include an indication of a SS block transmission pattern. The SS block transmission pattern can include a contiguous transmission of burst of SS blocks in at least one slot, a transmission of different SS blocks in different slots, and/or other patterns. Also, the received broadcast channel can include symbol-level timing information, slot-level timing information, and/or frame-level timing information. The symbol-level timing information can be symbol index timing information. The slot-level timing information can be slot index timing information. The frame-level timing information can be radio frame index timing information. Additionally, the indicated SS block transmission pattern can be for at least one SS burst being transmitted and each of the at least one SS burst can include a set of consecutive SS blocks without a gap between the consecutive SS blocks. Furthermore, the indicated SS block transmission pattern can be for SS block transmissions having at most one SS block in a slot.

At 930, a cell can be identified based on the detected PSS and SSS and based on successful decoding of the received broadcast channel. At 940, a set of slots potentially carrying the plurality of SS blocks can be identified based on the indicated SS block transmission pattern. For example, mobility measurements can be performed based on the identified set of slots potentially carrying the plurality of SS blocks.

According to a possible implementation, a UE can determine a RA-RNTI from a selected RACH resource, which can be based on the selected SS block. The UE can then monitor the physical-layer control channel for reception of a DL assignment with CRC scrambled by the determined RA-RNTI. The downlink assignment can be in DCI on a PDCCH. A MAC PDU can be carried on a PDSCH associated with the DL assignment.

Figure 10:
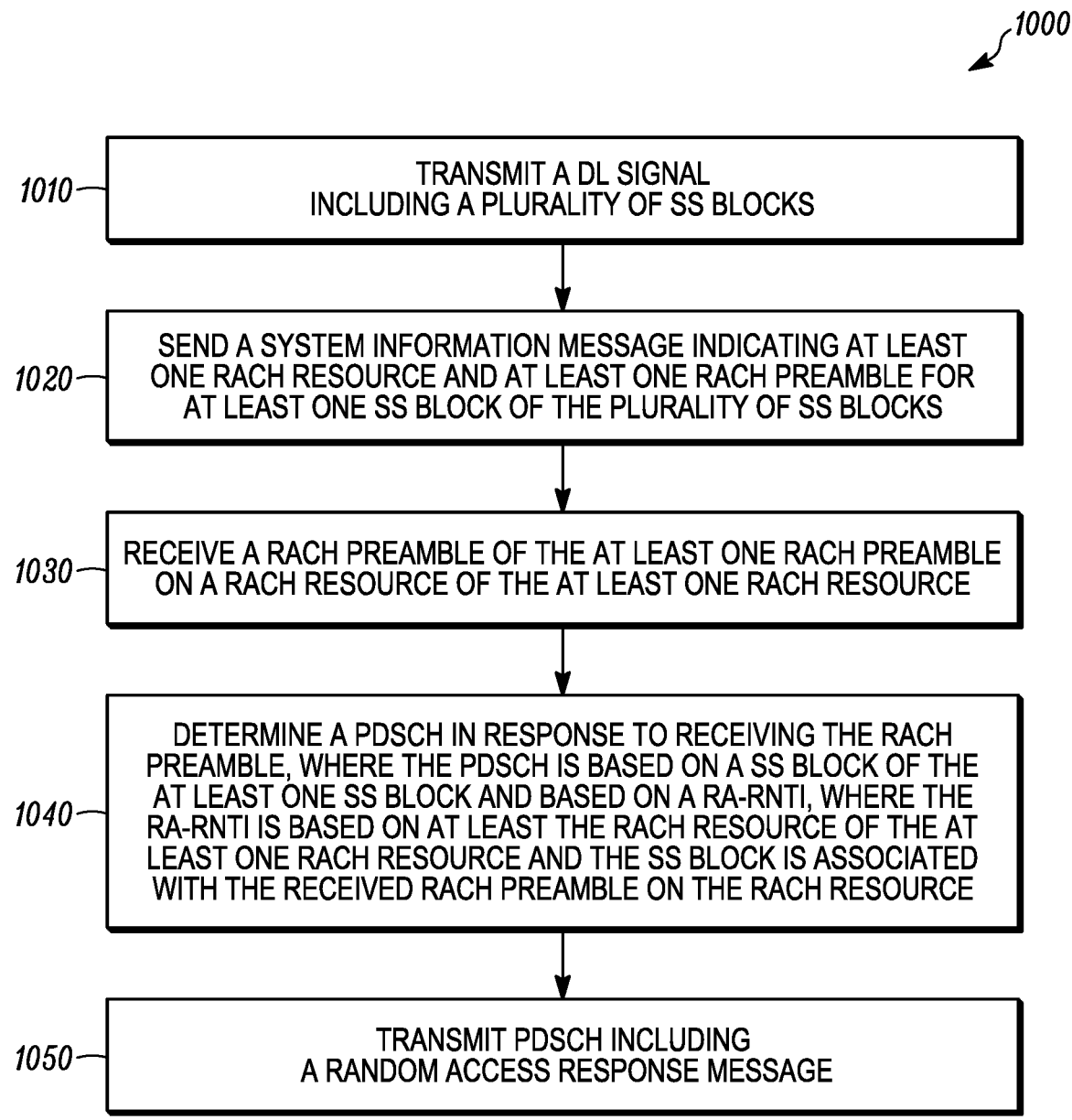
FIG. 10 is an example flowchart illustrating the operation of a wireless communication device according to a possible embodiment.

FIG. 10 is an example flowchart 1000 illustrating the operation of a wireless communication device, such as the NE 120, according to a possible embodiment. At 1010, a DL signal including a plurality of SS blocks can be transmitted. At 1020, a system information message can be sent. The system information message can indicate at least one RACH resource and at least one RACH preamble for at least one SS block of the plurality of SS blocks. At 1030, a RACH preamble of the at least one RACH preamble can be received on a RACH resource of the at least one RACH resource. At 1040, a PDSCH can be determined in response to receiving the RACH preamble. The PDSCH can be based on a SS block of the at least one SS block and based on a RA-RNTI. The RA-RNTI can be based on at least the RACH resource of the at least one RACH resource and the SS block can be associated with the received RACH preamble on the RACH resource. At 1050, a PDSCH including a RAR message can be transmitted. The PDSCH can carry at least one RACH preamble index and at least one backoff indicator. The at least one RACH preamble index and the at least one backoff indicator can be associated with different SS blocks.

According to a possible embodiment, a PDCCH with CRC can be transmitted on a control channel search space associated with the SS block. The CRC can be scrambled by the RA-RNTI. The SS block can be associated with a system information message that indicates a set of RACH resources including the RACH resource and the RACH preamble. For example, the SS block can carry the Physical Broadcast Channel (PBCH) that includes search space information for receiving the system information message.

According to a possible embodiment, an indication of a plurality of RACH preamble indices can be transmitted. The indication can be transmitted in a PDCCH message or a dedicated RRC message. Contention-free random access can be performed by a UE based on a RACH preamble index selected from the plurality of RACH preamble indices.

According to another possible implementation, an indication of a subset of SS blocks from the plurality of SS blocks can be transmitted. The RACH preamble index can be based on a SS block from the subset of SS blocks. Each of the plurality of RACH preamble indices can be associated with a distinctive SS block in the subset of SS blocks. Accordingly, the plurality of RACH preamble indices can be associated with the subset of SS blocks from the plurality of SS blocks.

According to another possible implementation, a configuration for a plurality of CSI-RS resources can be transmitted. An indication of a subset of CSI-RS resources from the configured plurality of CSI-RS resources can be transmitted. The RACH preamble index can be based on a CSI-RS resource from the subset of CSI-RS resources. The RACH preamble index and a RACH resource can be associated with the CSI-RS resource. For example, there can be mapping between the CSI-RS resource and the RACH preamble and the RACH resource.

According to a possible embodiment, an indication of a preamble index can be transmitted. An indication of a subset of SS blocks from the plurality of SS blocks can be transmitted. A RACH preamble that is scrambled based on a SS block from the subset of SS blocks can be received.

According to a possible embodiment, a PDCCH with a CRC can be transmitted on a control channel search space associated with a SS block. The PDCCH CRC can be scrambled with the RA-RNTI. Also, a MAC PDU can be transmitted on a PDSCH associated with the transmitted PDCCH. The MAC PDU can include either a MAC PDU including a set of RARs or a MAC PDU including a subset of the set of RARs.

According to a possible embodiment, the PDSCH can carry a plurality of random access backoff indicators. Each of the plurality of random access backoff indicators can be associated with different at least one SS blocks. Information of the associated at least one SS block for each of the plurality of random access backoff indicators can be transmitted.

According to a possible embodiment, a PSS and an SSS of the at least one SS block of the plurality of SS blocks can be transmitted. A broadcast channel associated with a SS block can be transmitted. The broadcast channel can include an indication of a SS block transmission pattern. The transmitted broadcast channel can also include symbol-level timing information, slot-level timing information, and/or frame-level timing information. The indicated SS block transmission pattern can be for at least one SS burst being transmitted and each of the at least one SS burst can include a set of consecutive SS blocks without a gap between the consecutive SS blocks. The indicated SS block transmission pattern can also be for SS block transmissions having at most one SS block in a slot.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 11:
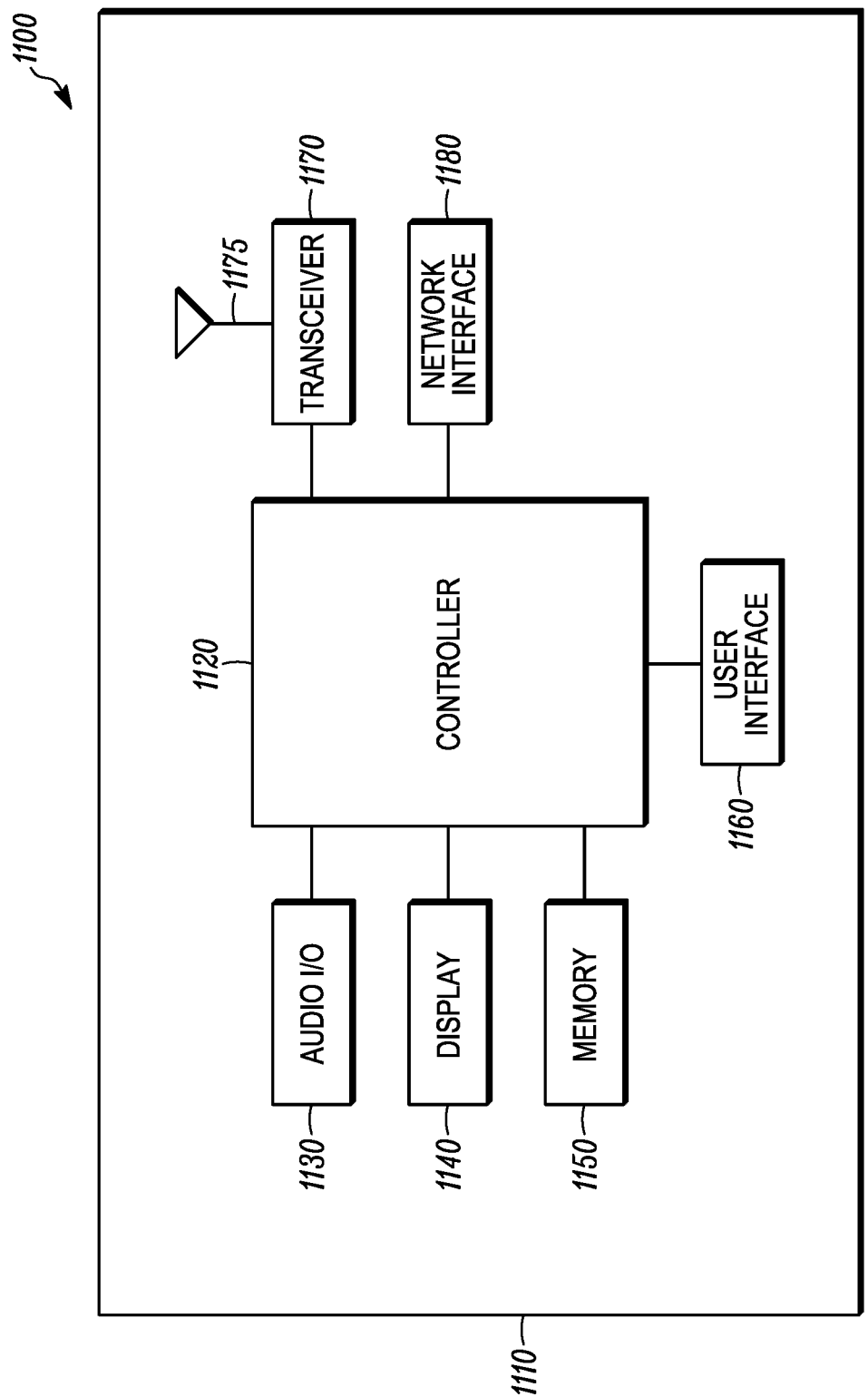
FIG. 11 is an example block diagram of an apparatus according to a possible embodiment.

FIG. 11 is an example block diagram of an apparatus 1100, such as the wireless communication device 110, the NE 120, an access point, or any other wireless communication device according to a possible embodiment. The apparatus 1100 can include a housing 1110, a controller 1120 within the housing 1110, audio input and output circuitry 1130 coupled to the controller 1120, a display 1140 coupled to the controller 1120, a transceiver 1170 coupled to the controller 1120, at least one antenna 1175 coupled to the transceiver 1170, a user interface 1160 coupled to the controller 1120, a memory 1150 coupled to the controller 1120, and a network interface 1180 coupled to the controller 1120. The apparatus 1100 can perform the methods described in all the embodiments.

The display 1140 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 1150 can be one or more transceivers that can include a transmitter and/or a receiver. The audio input and output circuitry 1130 can include a microphone, a speaker, a transducer, or any other audio input and output circuitry. The user interface 1160 can include a keypad, a keyboard, buttons, a touch pad, a joystick, a touch screen display, another additional display, or any other device useful for providing an interface between a user and an electronic device. The network interface 1180 can be a Universal Serial Bus (USB) port, an Ethernet port, an infrared transmitter/receiver, an IEEE 1394 port, a wireless transceiver, a WLAN transceiver, or any other interface that can connect an apparatus to a network, device, or computer and that can transmit and receive data communication signals. The memory 1150 can include a random access memory, a read only memory, an optical memory, a flash memory, a removable memory, a hard drive, a cache, or any other memory that can be coupled to an apparatus.

The apparatus 1100 or the controller 1120 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 1150 or elsewhere on the apparatus 1100. The apparatus 1100 or the controller 1120 may also use hardware to implement disclosed operations. For example, the controller 1120 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 1120 may be any controller or processor device or devices capable of operating an apparatus and implementing the disclosed embodiments. Some or all of the additional elements of the apparatus 1100 can also perform some or all of the operations of the disclosed embodiments.

In operation as a UE, the transceiver 1170 can receive a DL signal including a plurality of SS blocks from a NE. The controller 1120 can detect at least one SS block from the plurality of SS blocks. The controller 1120 can select a SS block from the detected at least one SS block. The controller 1120 can identify a subset of RACH resources and a subset of RACH preambles associated with the selected SS block. The controller 1120 can select a RACH resource from the subset of RACH resources and a RACH preamble from the subset of RACH preambles. The transceiver 1170 can transmit the selected RACH preamble on the selected RACH resource. The controller 1120 can determine a Random Access Radio Network Temporary Identifier (RA-RNTI) based on at least the selected RACH resource. The transceiver 1170 can receive at least a PDSCH including a Random Access Response (RAR) message, where the PDSCH can be based on the selected SS block and based on the determined RA-RNTI.

According to a possible embodiment, the controller 1120 can detect a PSS and an SSS of the at least one SS block of the plurality of SS blocks. The transceiver 1170 can receive a broadcast channel associated with a SS block. The broadcast channel can include an indication of a SS block transmission pattern. The controller 1120 can identify a cell based on the detected PSS and SSS and based on successful decoding of the received broadcast channel. The controller 1120 can identify a set of slots potentially carrying the plurality of SS blocks based on the indicated SS block transmission pattern.

In operation of the apparatus 1100 as a NE, the transceiver 1170 can transmit a DL signal including a plurality of SS blocks. The transceiver 1170 can send a system information message indicating at least one RACH resource and at least one RACH preamble for at least one SS block of the plurality of SS blocks. The transceiver 1170 can receive a RACH preamble of the at least one RACH preamble on a RACH resource of the at least one RACH resource. The controller 1120 can determine a PDSCH in response to receiving the RACH preamble. The PDSCH can be based on a SS block of the at least one SS block and based on a RA-RNTI. The RA-RNTI can be based on at least the RACH resource of the at least one RACH resource and the SS block is associated with the received RACH preamble on the RACH resource. The transceiver 1170 can transmit a PDSCH including a RAR message.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method at a user equipment, the method comprising:
    receiving, at the user equipment, a set of reference signals, where each of the set of reference signals is periodically transmitted by a network entity;
    receiving, via a dedicated radio resource control message, information of a plurality of random access channel preambles and a plurality of reference signals from the set of reference signals;
    detecting at least one reference signal of the plurality of reference signals;
    selecting a reference signal from the detected at least one reference signal; and
    transmitting a random access channel preamble of the plurality of random access channel preambles in a contention-free random access procedure, where the random access channel preamble for transmission is determined based on the selected reference signal.

2. The method according to claim 1, wherein the method further comprises:
    identifying a plurality of random access channel resources associated with the selected reference signal;
    selecting a random access channel resource from the plurality of random access channel resources; and
    transmitting the random access channel preamble on the random access channel resource.

3. The method according to claim 2, wherein the random access channel resource is a time and frequency random access channel resource.

4. The method according to claim 1,
    wherein the information includes association information of each of the plurality of random access channel preambles with each of the plurality of reference signals, and
    wherein the random access channel preamble for transmission is determined based on the selected reference signal and the received association information.

5. The method according to claim 1, wherein the plurality of reference signals comprises a plurality of synchronization signal blocks, where a synchronization signal block of the plurality of synchronization signal blocks comprises at least one synchronization signal.

6. The method according to claim 1,
    wherein the plurality of reference signals comprises a plurality of channel state information reference signals, and
    wherein the method further comprises:
        receiving configuration information of a plurality of channel state information reference signal resources; and
        receiving the plurality of channel state information reference signals on the plurality of channel state information reference signal resources.

7. The method according to claim 1, wherein the plurality of reference signals comprises at least one synchronization signal block and at least one channel state information reference signal.

8. The method according to claim 1, further comprising monitoring a control channel search space based on the selected reference signal in response to transmitting the random access channel preamble.

9. The method according to claim 1, further comprising receiving at least a physical downlink shared channel as a response to the transmitted random access channel preamble, wherein the random access channel preamble is transmitted on a random access channel resource.

10. The method according to claim 9, further comprising determining a random access radio network temporary identifier based on the random access channel resource, wherein receiving at least the physical downlink shared channel is based on the selected reference signal and based on the determined random access radio network temporary identifier.

11. The method according to claim 1, further comprising:
    receiving a broadcast channel associated with the selected reference signal; and
    obtaining timing information from the broadcast channel, wherein the timing information comprises at least one of symbol-level timing information, slot-level timing information, and frame-level timing information.

12. The method according to claim 11, wherein the broadcast channel further comprises information of a transmission pattern of the set of reference signals.

13. The method according to claim 1, wherein the set of reference signals is periodically transmitted with a common periodicity.

14. The method according to claim 1, further comprising performing mobility measurements on the set of reference signals.

15. An apparatus comprising:
    a transceiver that
        receives a set of reference signals, where each of the set of reference signals is periodically transmitted by a network entity, and
        receives, via a dedicated radio resource control message, information of a plurality of random access channel preambles and a plurality of reference signals from the set of reference signals; and
    a controller coupled to the transceiver, where the controller
        detects at least one reference signal of the plurality of reference signals, and
        selects a reference signal from the detected at least one reference signal,
    wherein the transceiver transmits a random access channel preamble of the plurality of random access channel preambles in a contention-free random access procedure, where the random access channel preamble for transmission is determined based on the selected reference signal.

16. The apparatus according to claim 15,
wherein the controller
identifies a plurality of random access channel resources associated with the selected reference signal, and
selects a random access channel resource from the plurality of random access channel resources, and
wherein the transceiver transmits the random access channel preamble on the random access channel resource.

17. The apparatus according to claim 15,
wherein the information includes association information of each of the plurality of random access channel preambles with each of the plurality of reference signals, and
wherein the random access channel preamble for transmission is determined based on the selected reference signal and the received association information.

18. The apparatus according to claim 15, wherein the plurality of reference signals comprises a plurality of synchronization signal blocks, where a synchronization signal block of the plurality of synchronization signal blocks comprises at least one synchronization signal.

19. The apparatus according to claim 15,
wherein the plurality of reference signals comprises a plurality of channel state information reference signals, and
wherein the transceiver
receives configuration information of a plurality of channel state information reference signal resources, and
receives the plurality of channel state information reference signals on the plurality of channel state information reference signal resources.

20. The apparatus according to claim 15, wherein the plurality of reference signals comprises at least one synchronization signal block and at least one channel state information reference signal.

* * * * *